Figure 1:
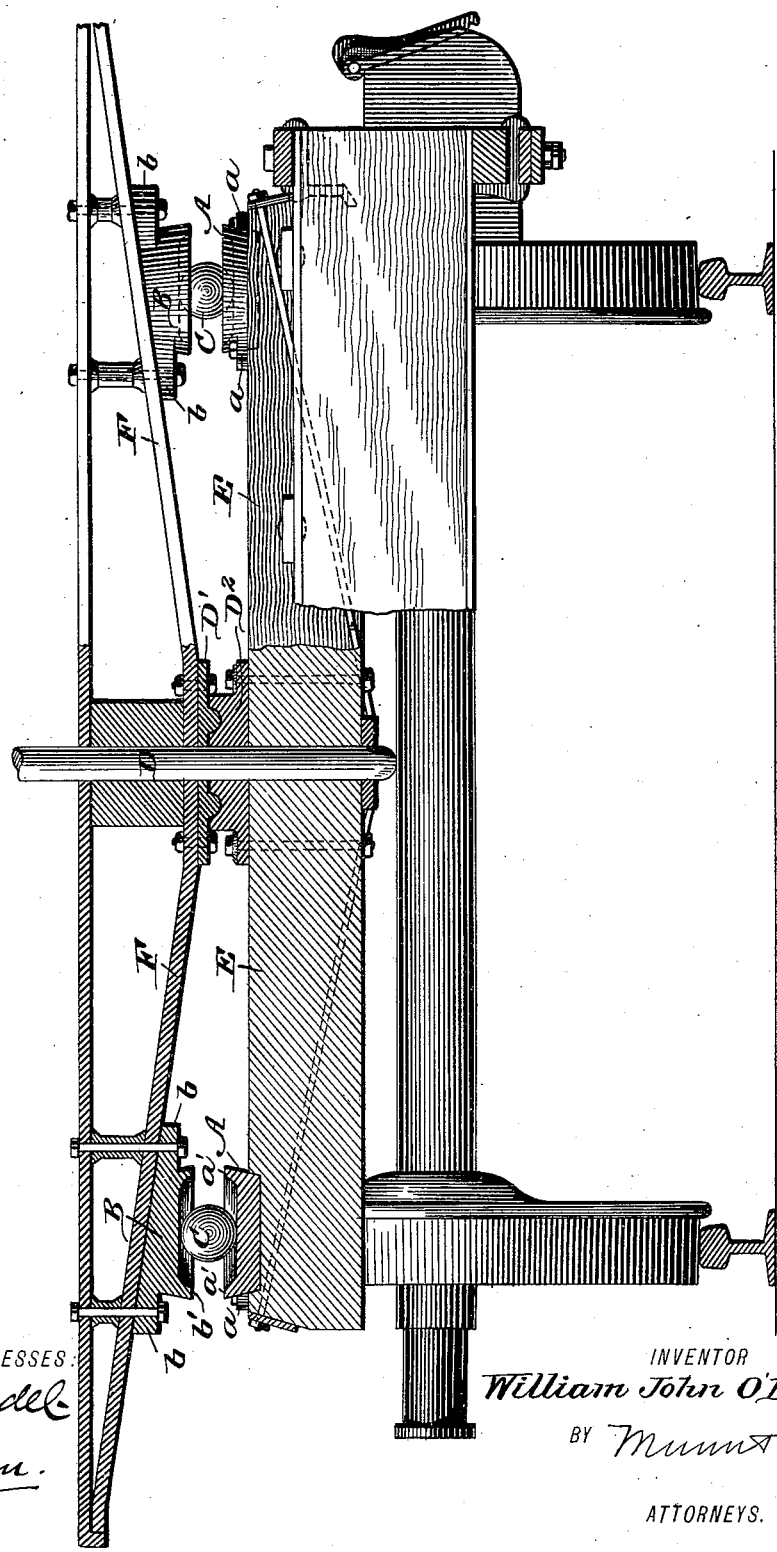

(No Model.) 2 Sheets—Sheet 1.

W. J. O'BYRNE.
CAR TRUCK BEARING.

No. 564,532. Patented July 21, 1896.

WITNESSES:
M. D. Blondel
Edw. W. Byrn.

INVENTOR
William John O'Byrne.
BY Munn & Co
ATTORNEYS.

(No Model.) 2 Sheets—Sheet 2.
W. J. O'BYRNE.
CAR TRUCK BEARING.
No. 564,532. Patented July 21, 1896.
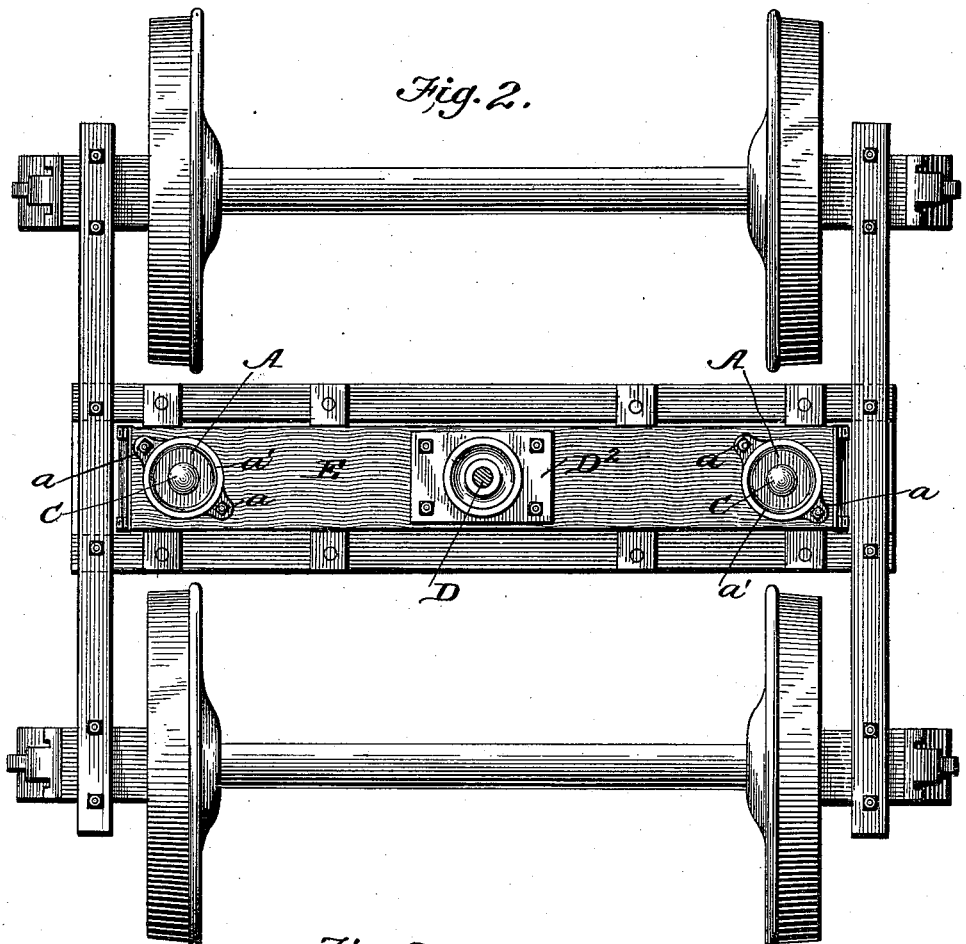
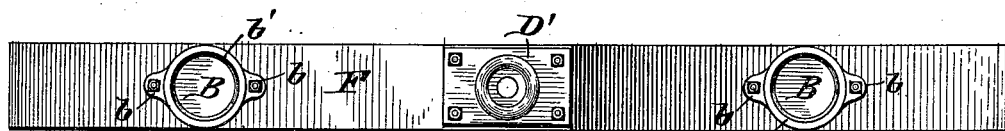
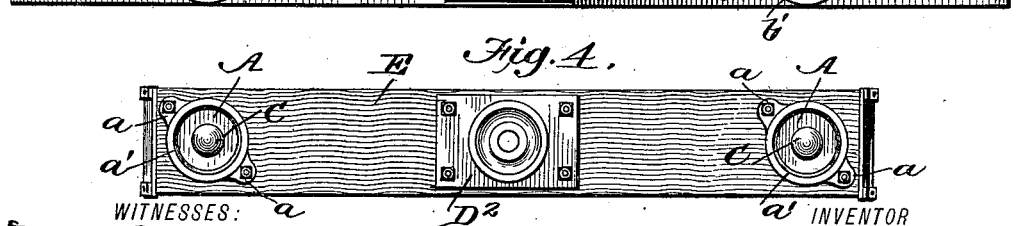
WITNESSES:
M. P. Blondel
Edw. U. Byrn
INVENTOR
William John O'Byrne
BY Munn & Co.
ATTORNEYS.

UNITED STATES PATENT OFFICE.

WILLIAM JOHN O'BYRNE, OF PONTOOSUC, ILLINOIS.

CAR-TRUCK BEARING.

SPECIFICATION forming part of Letters Patent No. 564,532, dated July 21, 1896.

Application filed April 4, 1896. Serial No. 586,235. (No model.)

*To all whom it may concern:*

Be it known that I, WILLIAM JOHN O'BYRNE, of Pontoosuc, in the county of Hancock and State of Illinois, have invented a new and useful Improvement in Car-Truck Bearings, of which the following is a specification.

In the present construction of railway-cars the car has at each end a king-bolt or vertical pivot which connects the transverse body-bolster of the car to the swing-beam of the truck, and on each side of the king-bolt there is a bearing between the said body-bolster and the swing-beam of the truck, located near the outer ends of the said body-bolster and swing-beam, for the purpose of easing the car as it sways from side to side and for relieving the center bearing of a part of the burden in turning around curves. These side bearings provide for a slight oscillation of the body-bolster on the swing-beam of the truck and are constructed of metal plates or blocks whose adjacent faces are usually lubricated by having the lower plate hollowed out slightly on top and filled with oil and waste. Such bearings are, however, very objectionable, in that if they are not provided with oil they grip and do not allow a sensitive automatic adjustment of the truck to curves in the track, and it is so difficult to examine or get access to said bearings to oil them that they are frequently neglected, and when such bearings grip or get locked against each other by an extreme deflection it is very apt to throw the wheels off the rails, and when so thrown off the truck is so locked in its skewed position that it cannot readjust itself, even if the car-couplings in front and rear are maintained, and the result is that a disastrous wreck occurs which would have been entirely avoided if these side bearings were maintained sensitive in their relation, so that they could easily adjust and readjust themselves.

My invention is designed to provide a side bearing which shall overcome these difficulties; and it consists in two plates adapted to be connected by bolts to the adjacent faces of the body-bolster and swing-beam, and which plates are recessed or made cup-shaped on their adjacent faces to form small oscillating tables with a circular retaining marginal flange, between which surfaces a large metal ball is placed and is free to roll in all directions, being retained by the marginal flanges, so as to form a sensitive bearing between the body-bolster and swing-beam at each end, which will allow the trucks to readily adjust and readjust themselves in all directions, as hereinafter fully described.

Figure 1 is a transverse vertical section through the side bearing; Fig. 2, a plan view of the truck. Fig. 3 is an underneath view of the body-bolster. Fig. 4 is a plan view of the swing-beam of the truck, with the lower bearing applied to the same.

In the drawings, A represents the lower bearing block or plate, which is of circular shape and provided with perforated lugs or ears $a\ a$, by which it is bolted to the swing-beam. This lower bearing is flat on its upper face and is recessed so as to leave a marginal retaining-flange $a'$.

B is the upper bearing-plate. This is also of a circular shape and is provided with perforated ears or lugs $b$, by which it is bolted to the under side of the body-bolster of the car. The plate B is also recessed upon its lower side and has a marginal flange $b'$. The two adjacent faces of these plates form table-surfaces, between which is placed a metal ball C, case-hardened, or made of steel and turned perfectly true. This ball is retained against escaping by the retaining-flanges $a'\ a'$, and the plates moving over each other, with the ball rolling between, have a play or oscillating range of about three inches. The ball itself is about three and a half inches in diameter, and is effectually retained against escape from its table-surfaces by the marginal flanges of the plates.

The lower bearing A is seated in a recess of the swing-beam E and is bolted thereto, while the upper bearing B is made thicker at its outer edges to compensate for the incline of the bottom surface of the body-bolster F and is bolted thereto through the lugs $b$. These side bearings are arranged at equal distances from the king-bolt D and center bearings $D'\ D^2$ and fully overcome the difficulties hereinbefore named. These side bearings are very sensitive, very durable, do not require oiling, and greatly reduce the number of wrecks, with their incidental loss of life, property, and delays to travel.

I am aware that a side bearing for the car-body bolster has been provided in which a series of antifriction-balls have been arranged between two plates, which had curved channel-ways just wide enough to receive the balls, which curve was struck from the center bolt or king-bolt of the car, and I make no claim to any such construction.

My invention is distinctive in the fact that the table-surfaces are flat and retaining-flanges are circular, and the ball is not retained to any curve, but rolls freely in all directions. This is very necessary in order to take up or provide for the lateral swaying or lunging of the car-body, which always takes place on curves.

Another necessary and distinct feature of my invention is that there is but a single ball of relatively large size, but of less diameter than the diameter of the circular table-surfaces, and this ball rolls or moves progressively over the table-surfaces as it rotates about its center, and it moves sensitively without any sliding friction whatever.

Having thus described my invention, what I claim as new, and desire to secure by Letters Patent, is—

1. A side bearing for railway-cars, comprising two plates having their adjacent faces flat and provided with circular marginal flanges, combined with a single ball of large diameter rolling between said plates freely in all directions from side to side of the table-surfaces between the flanges said flat table-surfaces being of greater diameter than that of the ball subtantially as and for the purpose described.

2. A side bearing for railway-cars comprising two plates having their adjacent faces flat and provided with circular marginal flanges the upper plate having its back or top inclined, combined with a single ball of large diameter rolling between said plates freely in all directions from side to side of the table-surfaces between the flanges, said flat table-surfaces being of greater diameter than that of the ball substantially as and for the purpose described.

WILLIAM JOHN O'BYRNE.

Witnesses:
 LOUIS THANNERT,
 BERT E. THANNERT.